United States Patent
Sivinski

(10) Patent No.: US 11,606,897 B2
(45) Date of Patent: Mar. 21, 2023

(54) BULK SEED DISTRIBUTOR

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 130 days.

(21) Appl. No.: 17/301,197

(22) Filed: Mar. 29, 2021

(65) Prior Publication Data
US 2021/0307238 A1 Oct. 7, 2021

Related U.S. Application Data

(60) Provisional application No. 63/004,562, filed on Apr. 3, 2020.

(51) Int. Cl.
*A01C 7/08* (2006.01)

(52) U.S. Cl.
CPC .............. *A01C 7/084* (2013.01); *A01C 7/082* (2013.01)

(58) Field of Classification Search
USPC .......................................... 406/123; 239/655
See application file for complete search history.

(56) References Cited

U.S. PATENT DOCUMENTS

| | | | | |
|---|---|---|---|---|
| 3,554,607 A | * | 1/1971 | Herman et al. | B65G 53/00 406/123 |
| 4,131,072 A | * | 12/1978 | Lingl, Jr. | F23N 5/188 110/106 |
| 4,215,824 A | * | 8/1980 | Weiste | A01C 7/084 406/123 |
| 4,475,819 A | * | 10/1984 | Balmer | A01C 7/084 366/156.1 |
| 4,815,414 A | * | 3/1989 | Duffy | B05B 7/1477 118/308 |
| 4,874,130 A | * | 10/1989 | Wondergem | A01C 7/084 239/665 |
| 4,913,344 A | * | 4/1990 | Bauer | A01C 15/04 239/654 |
| 5,114,078 A | * | 5/1992 | Takata | A01C 15/04 239/689 |
| 5,125,583 A | * | 6/1992 | Strand | A01M 9/003 406/79 |
| 5,379,706 A | * | 1/1995 | Gage | A01C 15/04 406/146 |

(Continued)

FOREIGN PATENT DOCUMENTS

| | | |
|---|---|---|
| EP | 1342400 A1 | 9/2003 |
| WO | 2012170690 A2 | 12/2012 |

*Primary Examiner* — Joseph A Dillon, Jr.
(74) *Attorney, Agent, or Firm* — McKee, Voorhees & Sease, PLC

(57) ABSTRACT

A seed distributor evenly delivers seed from a bulk seed tank via hoses to seed bins on row planter units. The distributor has a circular chamber for receiving seeds from the seed tank. An internal cone in the distributor deposits the seeds 360° around the chamber. Seed tubes extend through the sidewall of the chamber. Pressurized air is introduced into the chamber and picks up seeds on the floor of the chamber and pass through the seed tubes for delivery by the hoses to the bins. The distributor may also include air tubes aligned with the seed tubes to further assure even distribution of seeds to the bins.

20 Claims, 21 Drawing Sheets

(56) References Cited

U.S. PATENT DOCUMENTS

| | | | | |
|---|---|---|---|---|
| 6,688,244 B1* | 2/2004 | Meyer | ............... | A01C 15/04 |
| | | | | 111/177 |
| 7,025,010 B2* | 4/2006 | Martin | ............... | A01C 7/081 |
| | | | | 111/175 |
| 7,462,002 B2* | 12/2008 | Mayerle | ............... | A01C 7/081 |
| | | | | 221/211 |
| 8,348,556 B2* | 1/2013 | Hilgraf | ............... | F27B 1/10 |
| | | | | 406/146 |
| 8,821,078 B2* | 9/2014 | Hockett | ............... | B65G 51/02 |
| | | | | 111/175 |
| 8,894,330 B2* | 11/2014 | Gluch | ............... | A24C 5/391 |
| | | | | 406/181 |
| 10,773,904 B2* | 9/2020 | Peterac | ............... | A01C 7/084 |
| 2012/0312211 A1* | 12/2012 | Hubalek | ............... | A01C 7/084 |
| | | | | 111/175 |
| 2016/0157418 A1* | 6/2016 | Henry | ............... | A01C 7/084 |
| | | | | 701/50 |
| 2020/0079636 A1* | 3/2020 | Würzbauer | ............... | B67C 3/28 |
| 2021/0307238 A1* | 10/2021 | Sivinski | ............... | A01C 7/082 |

* cited by examiner

BULK SEED DISTRIBUTOR

CROSS-REFERENCE TO RELATED APPLICATIONS

This application claims priority to Provisional Application U.S. Ser. No. 63/004,562, filed on Apr. 3, 2020, which is herein incorporated by reference in its entirety.

BACKGROUND OF THE INVENTION

Crop seed planting is conventionally done using multiple row planters mounted on the toolbar pulled behind a tractor. Seed is pneumatically delivered from a large seed hopper to the smaller seed bins on each of the row planter units for planting via a seed meter on each row unit. A seed plenum or distributor resides beneath the primary hopper and is connected to a source of pressurized air which carries the seeds from the plenum through hoses to the seed bins on the row units. The seed distributor is typically elongated, with a rectangular shape, with a plurality of tubes or nozzles extending along each side of the plenum to which the hoses are attached. One problem with the elongated distributor is uneven seed distribution, which causes unequal filling of the seed bins on the row units. This leads to the seed bins becoming empty at different times during the planting operation. This non-uniform emptying of the conventional elongated seed distributor is undesirable, since the operator must stop the planting operation to manually redistribute and level seed in the distributor, which increases the planting time.

Therefore, there is a need for an improved bulk seed distributor which overcomes the problems of the prior art.

Accordingly, a primary objective of the present invention is the provision of a round bulk seed distributor which provides uniform distribution of seed for even delivery to the seed bins on the row planters.

Another objective of the present invention is a provision of a bulk seed planter which optimizes seed planting and minimizes planting time.

A further objective of the present invention is the provision of a round bulk seed distributor which eliminates the need for manually redistributing seed within the distributor.

Yet another objective of the present invention is the provision of a bulk seed distributor having a floor which can be quickly and easily opened and closed for cleanout of the distributor.

A further objective of the present invention is the provision of a method of uniformly distributing seeds from a bulk seed hopper to seed bins on row planter units.

Still another objective of the present invention is a provision of a circular seed distributor which provides consistent and even delivery of seeds to row planter seed bins.

Still another objective of the present invention is a provision of a method for pneumatically filling row planter seed bins using a circular seed distributor.

These and other objectives become apparent from the following description of the invention.

SUMMARY OF THE INVENTION

A round seed distributor having a circular seed chamber receives seeds from a bulk seed hopper and pneumatically conveys the seeds via seed hoses to seed bins on row planter units for planting. The distributor includes a floor assembly having an air inlet for receiving air from a pressurized air source. The sidewall of the distributor includes a plurality of hoses, each being connected to one of the seed bins through which seeds are pneumatically conveyed from the distributor to the seed bins. The distributor includes an internal cone which distributes seeds 360° around the chamber. In one embodiment, the cone includes a plurality of air tubes to direct the pressurized air to the seed tubes.

In the method of the present invention, seeds from the bulk seed hopper are delivered to the round distributor and deposited 360° adjacent the distributor sidewall. Pressurized air entering the distributor chamber carries seeds through seed tubes to the row planter seed bins. The circular shape of the distributor maintains even distribution of seeds to the bins for more efficient planting.

DETAILED DESCRIPTION OF THE INVENTION

Figure 1:
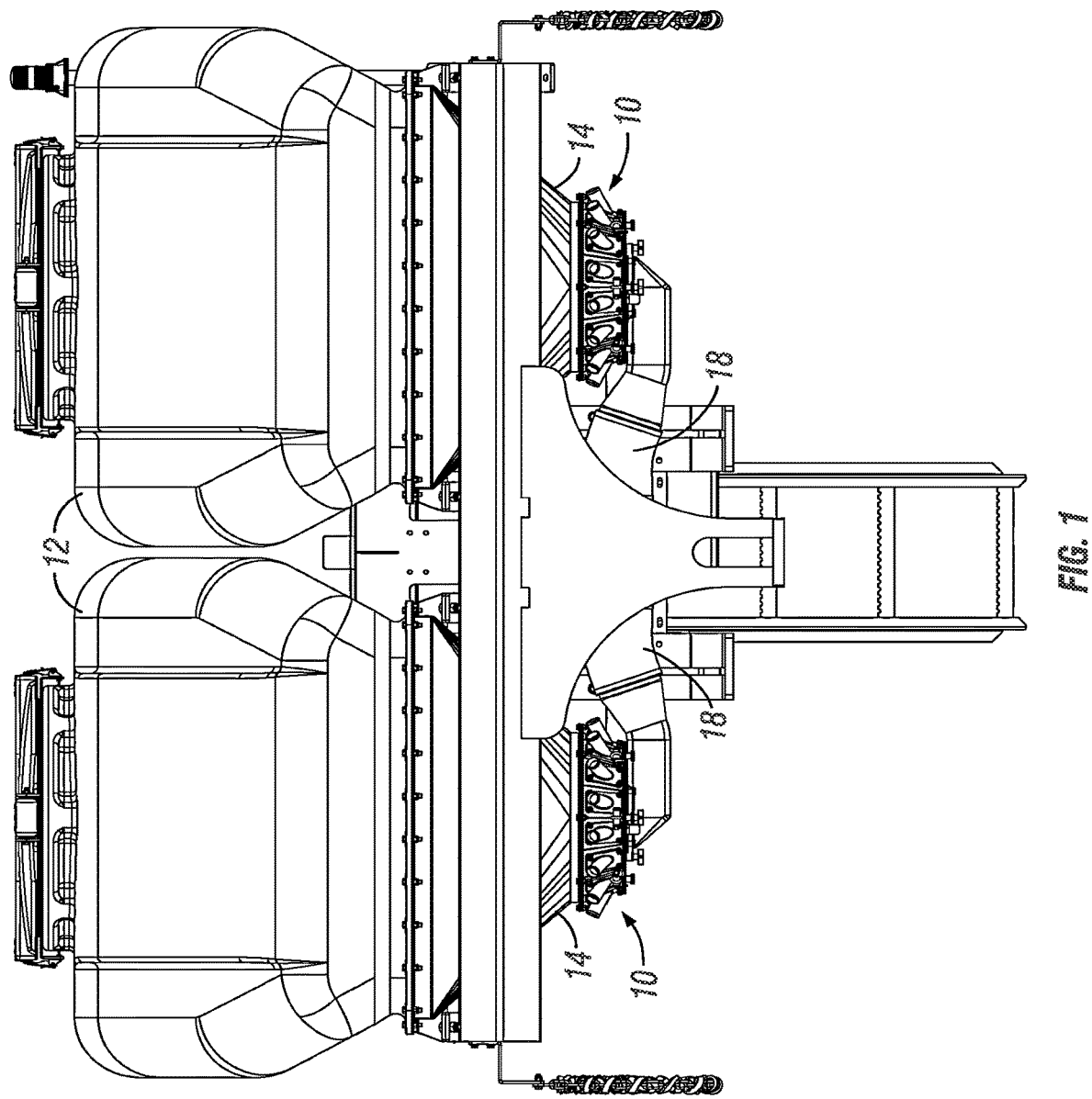
FIG. 1 is a front elevation view of a pair of primary seed hoppers each having the bulk seed distributor according to the present invention.
Figure 2:
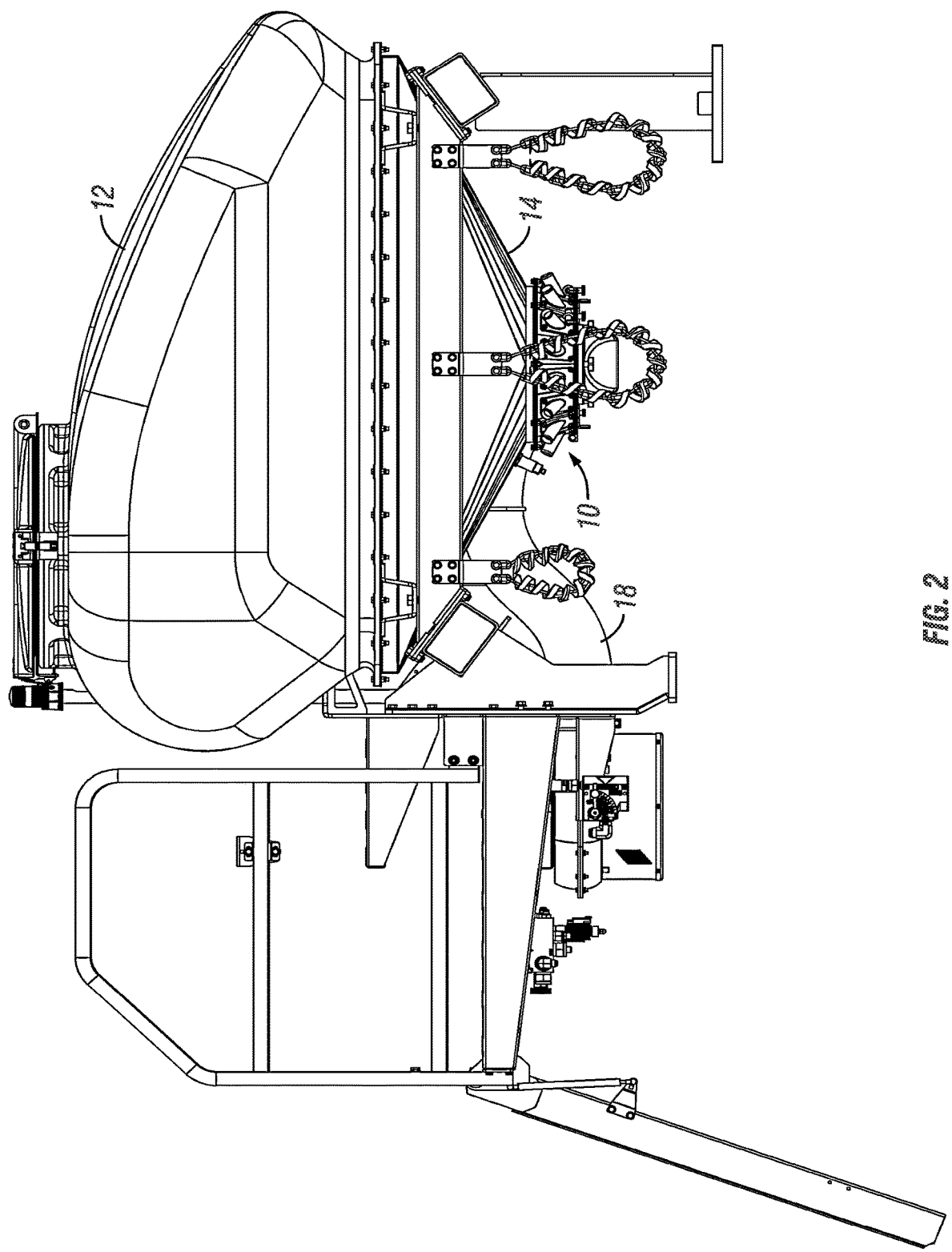
FIG. 2 is a side elevation view of one of the primary seed hoppers with the bulk seed distributor according to the present invention.
Figure 3:
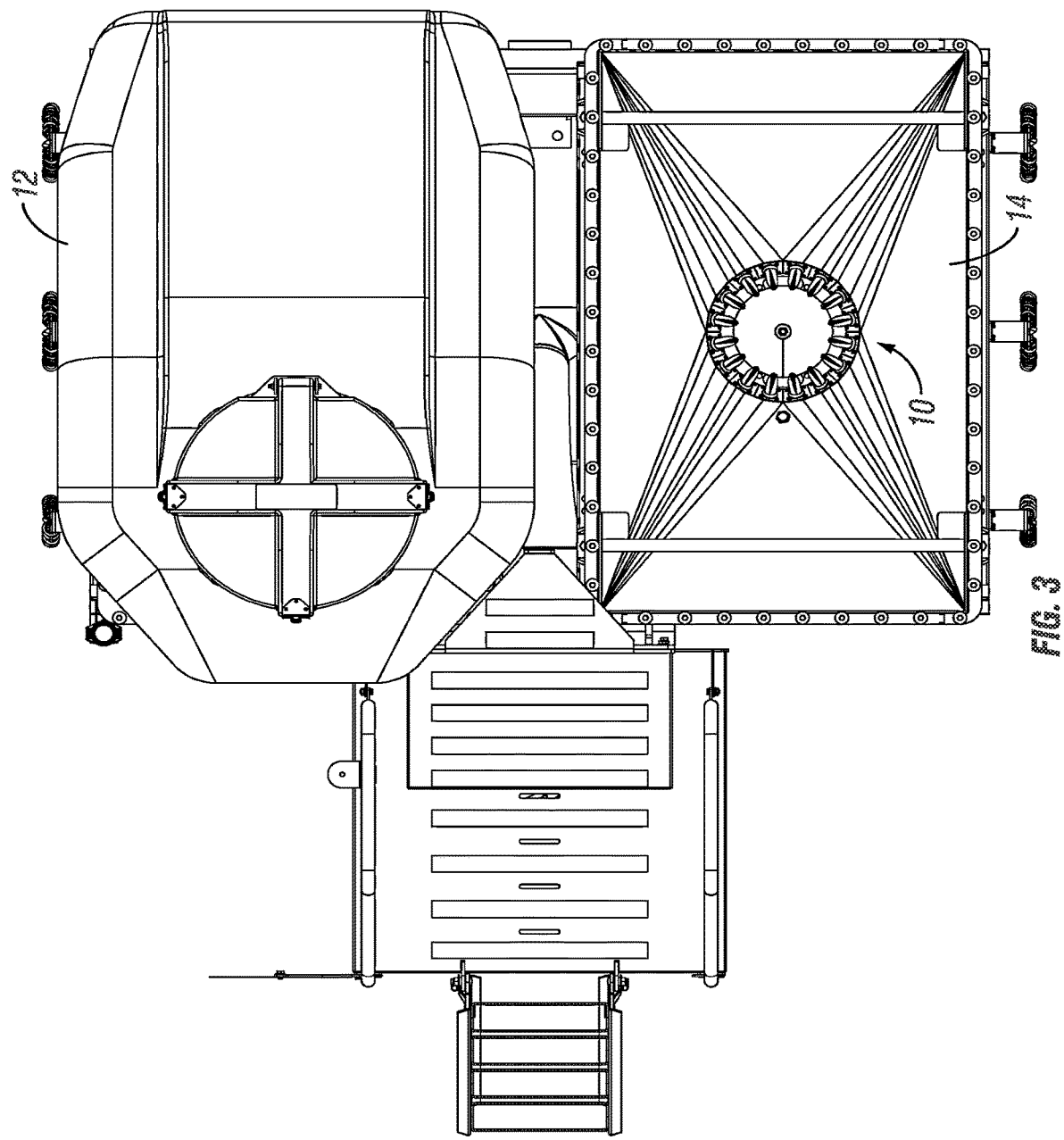
FIG. 3 is a top plane view of the structure shown in FIG. 1, with one of the primary seed hoppers being removed to show the round bulk seed distributor according to the present invention.
Figure 4:
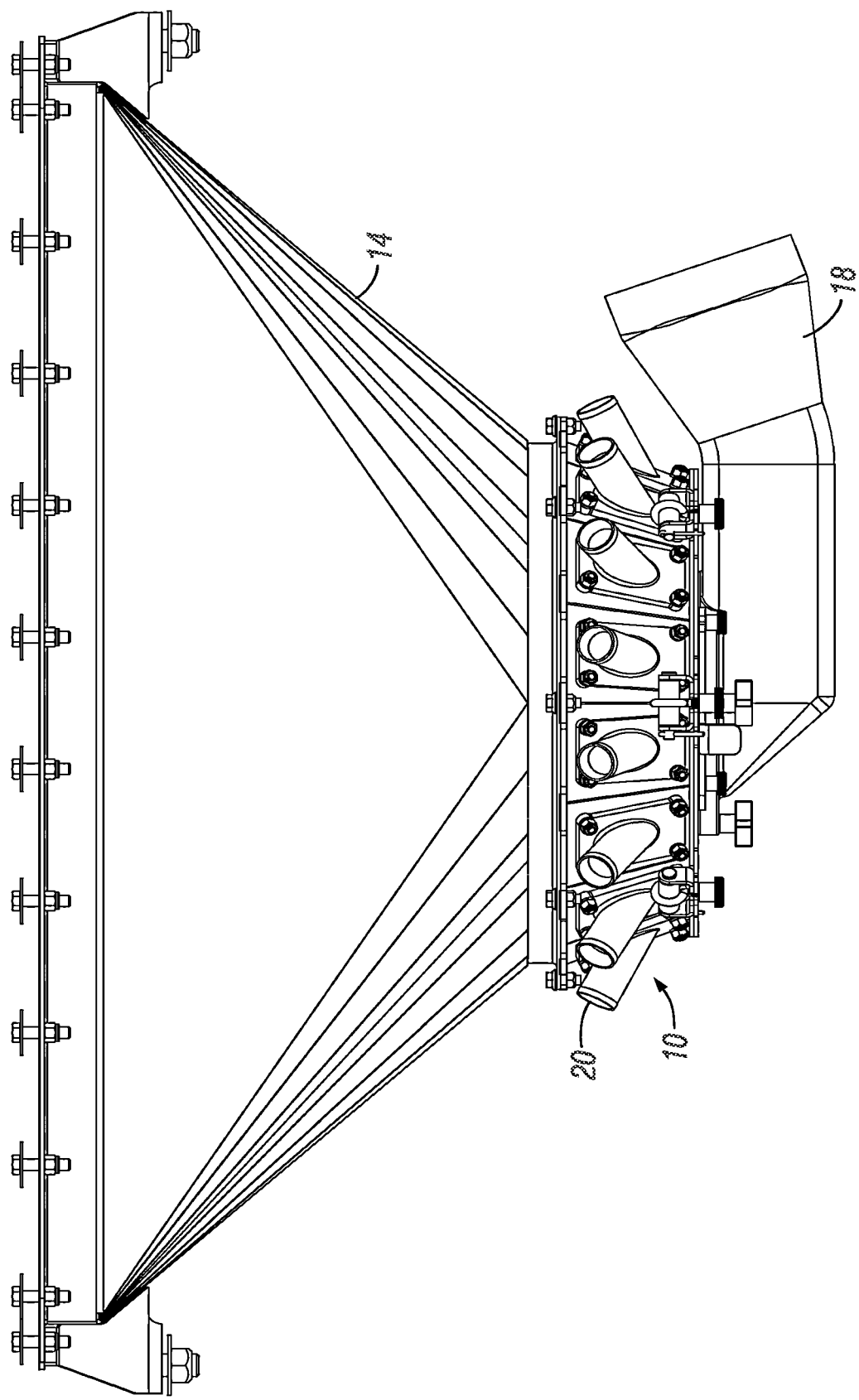
FIG. 4 is a side elevation view showing the round bulk seed distributor of the present invention.
Figure 5:
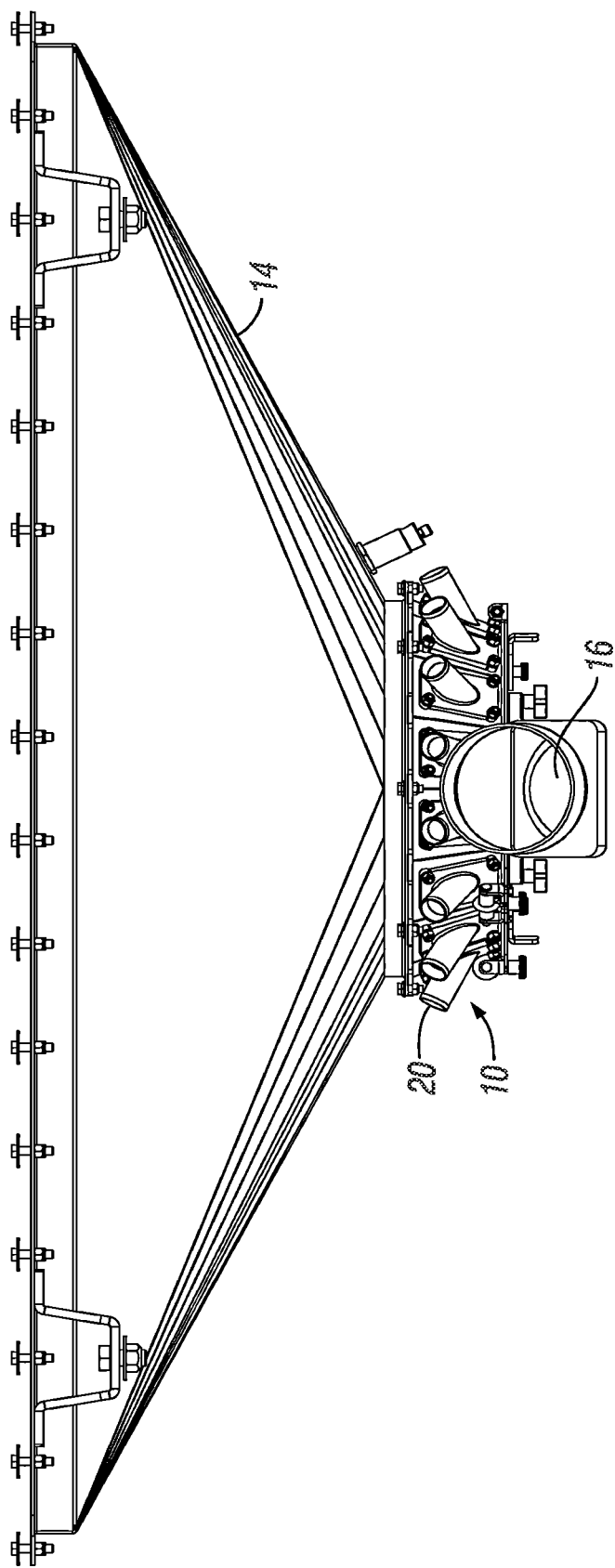
FIG. 5 is a front elevation view of the round bulk seed distributor of the present invention.
Figure 6:
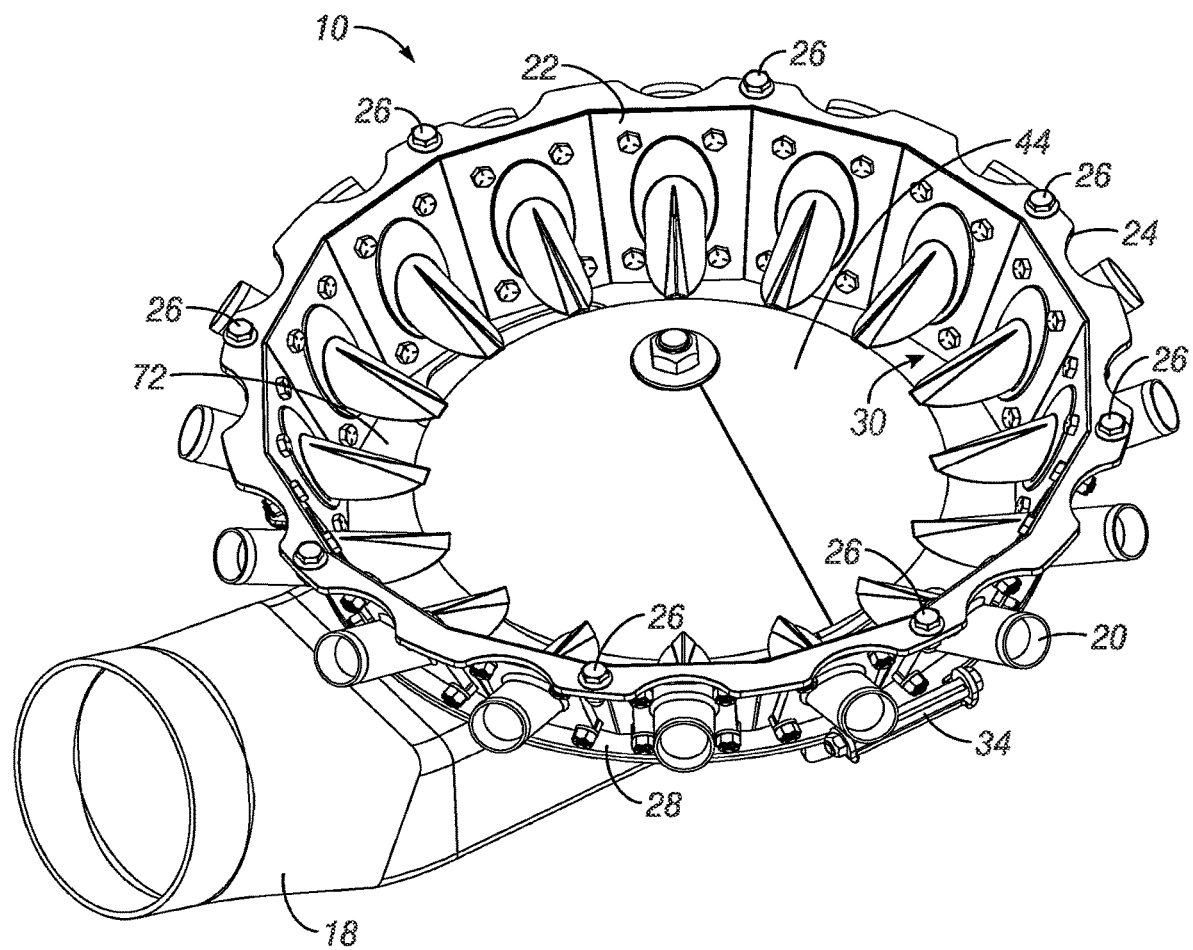
FIG. 6 is a perspective view of the round bulk seed distributor according to the present invention.
Figure 7:
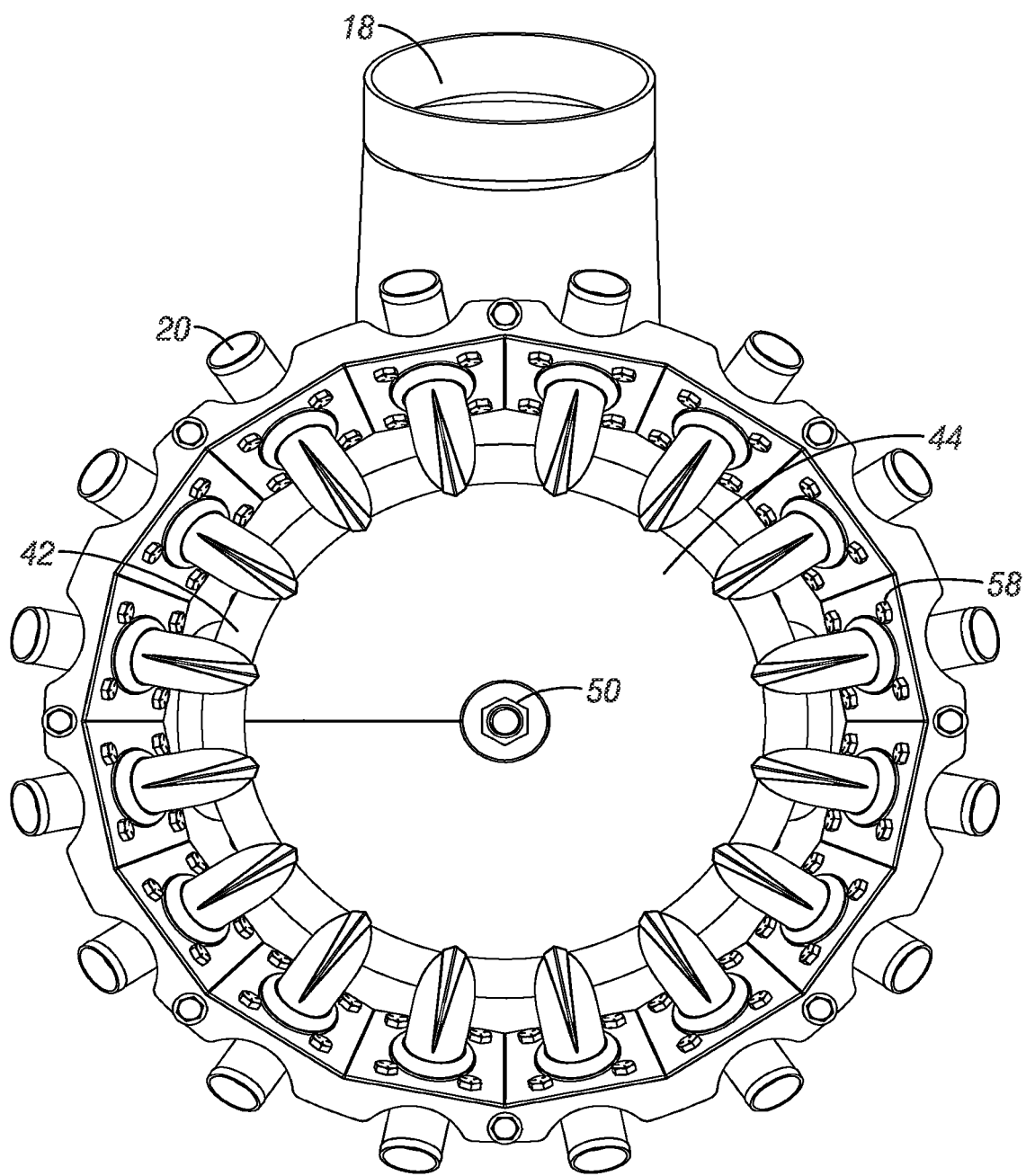
FIG. 7 is a top plane view of the round bulk seed distributor.
Figure 8:
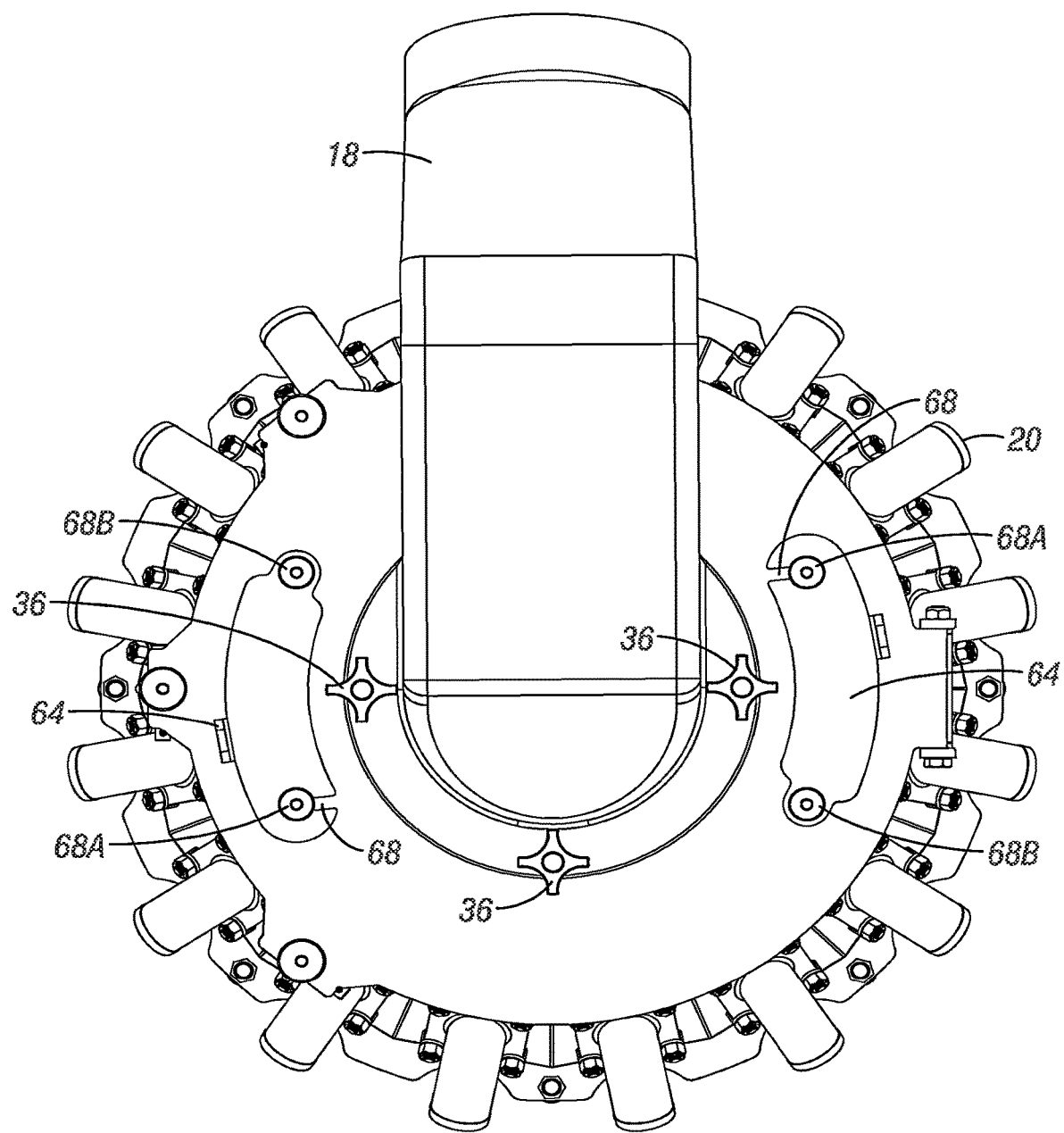
FIG. 8 is a bottom plane view of the round bulk seed distributor.
Figure 9:
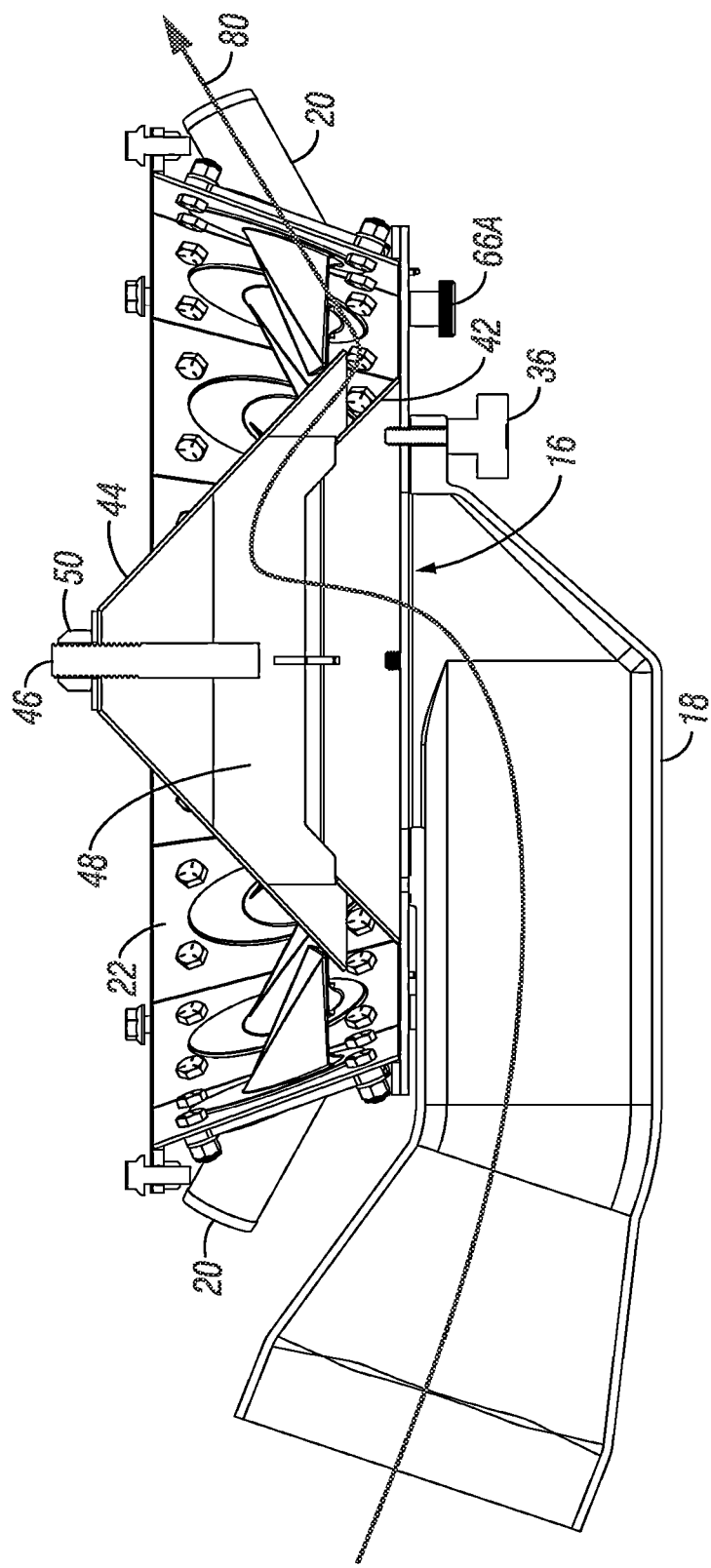
FIG. 9 is a sectional view through the round bulk seed distributor and showing the airflow path through the plenum.

The circular bulk seed plenum or distributor 10 of the present invention is used in conjunction with any conventional seed hopper or tank 12 used with row planter units (not shown). The distributor 10 is mounted on the bottom of the hopper funnel 14 to receive seed from the hopper 12. An air inlet 16 is provided in the bottom of the distributor 10 and is connected to a source of pressurized air via a conduit 18. A plurality of tubes or nozzles 20 extend around the perimeter of the distributor 10. A hose (not shown) is attached to each nozzle 20 and extends to a seed bin of a row planter unit, whereby seed is pneumatically carried from the distributor 10 to the row planter bins for discharge by any conventional seed meter on the row unit.

Figure 10:
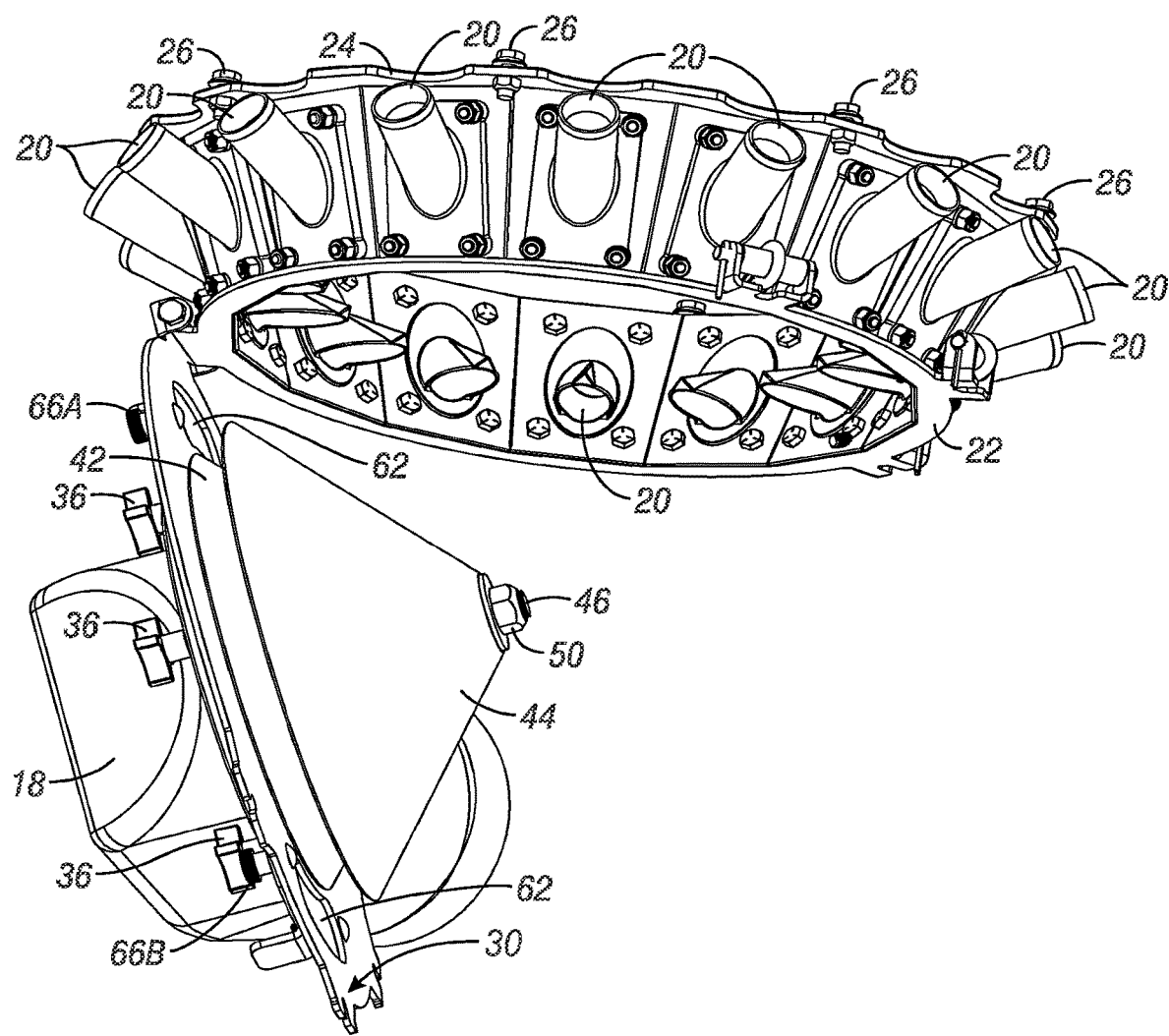
FIG. 10 is a perspective view of the distributor with the floor in an open position for seed cleanout and inspection.
Figure 11:
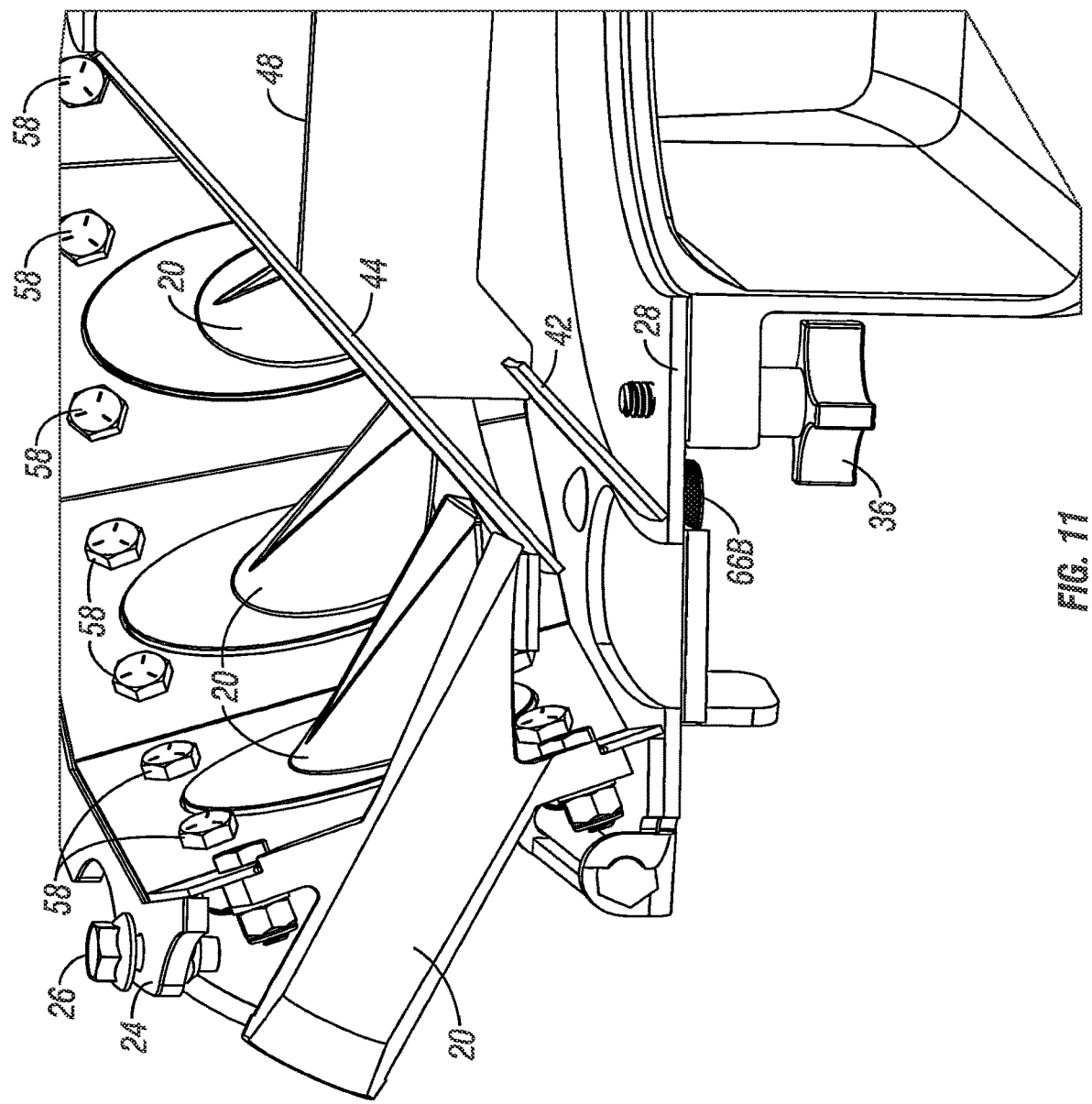
FIG. 11 is an enlarged partial sectional view of the distributor.

More particularly, as best seen in FIGS. 6-9, the distributor 10 has a sidewall 22 having an upper perimeter flange 24 for mounting to the outlet of the funnel 14 using bolts 26. The sidewall 24 has a lower flange 28 to which the floor 30 of the distributor is pivotally or detachably connected. In the preferred embodiment, the floor 30 includes a perimeter ring or plate 32 which is pivotally connected to the lower flange 28 for movement between a closed position (FIGS. 3-9) and opened position (FIG. 10). The connection between the plate 32 and the floor 30 may take various forms, such as a hinge bolt 34, with threaded retention knobs 36 which can be removed to allow the floor 30 to swing open about the axis of the bolt 34 from the closed position. The air conduit 18 is detachably mounted to the floor plate 32 by removable threaded retention knobs 38 extending upwardly through a mounting ring 40 on the conduit 18 and threaded apertures in the floor plate 32.

Figure 12:
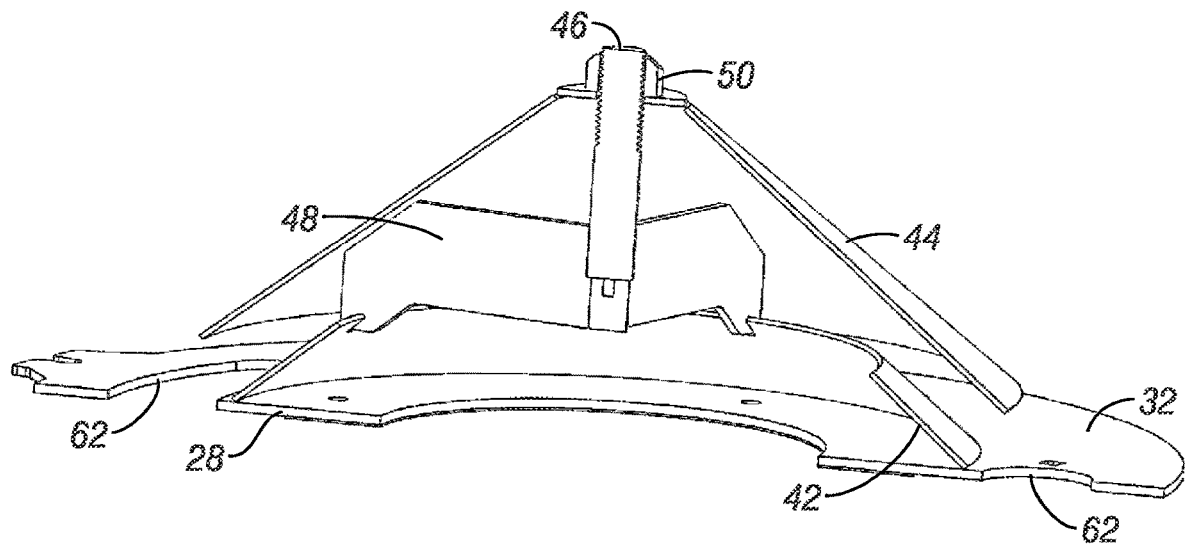
FIG. 12 is a sectional view of the distributor floor cone assembly.
Figure 13:
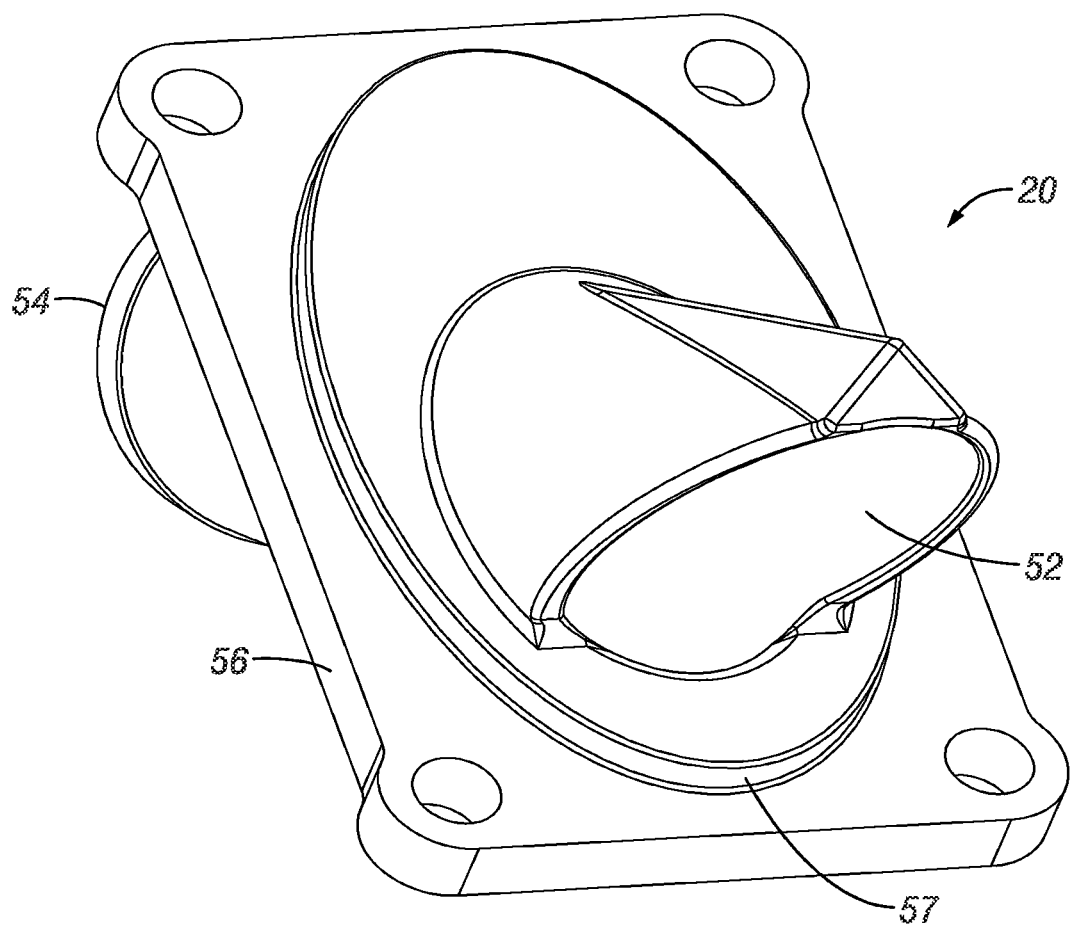
FIG. 13 is a perspective view of one of the seed nozzles of the present invention.
Figure 14:
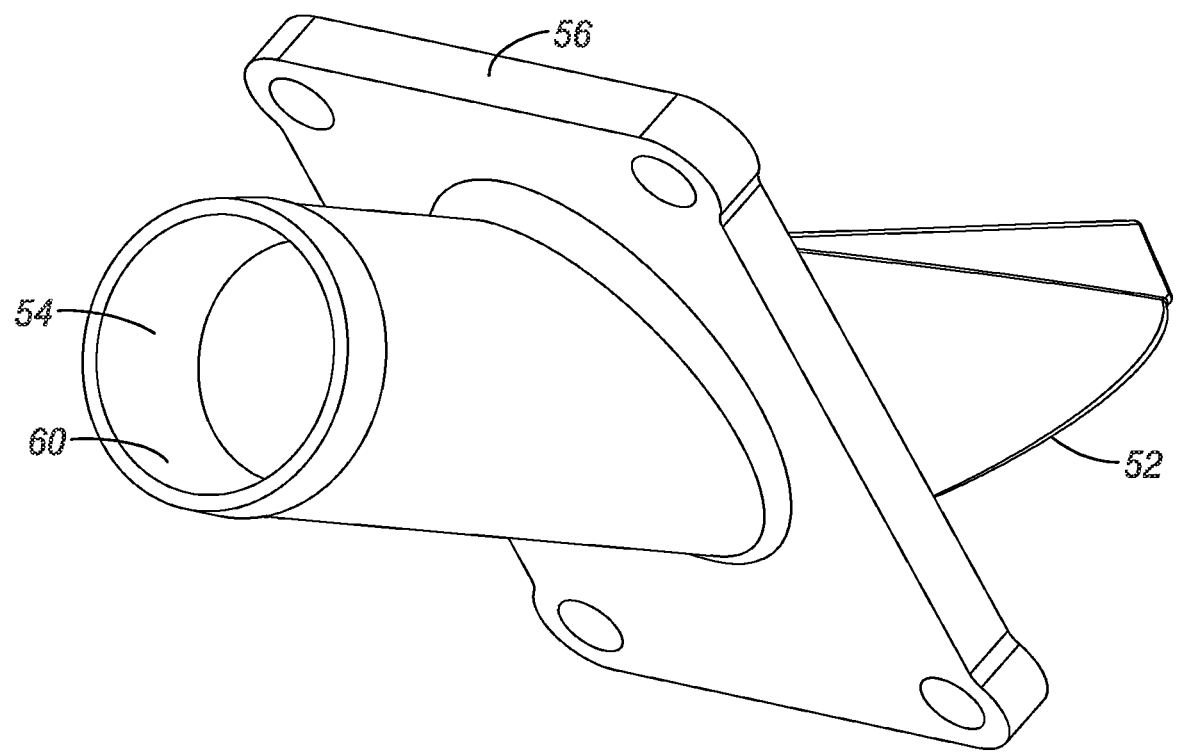
FIG. 14 is another perspective view of one of the seed nozzles of the plenum.

The floor assembly 30 has a lower truncated cone 42 fixed on the plate 32. An upper cone 44 is removably mounted above the lower cone 42 in any convenient manner. For example, shown in FIG. 12, the upper cone 44 is mounted on a central post 46 extending upwardly from support legs 48 extending radially inwardly from the lower cone 42. A nut 50 is threadably received on the post 46 to retain the upper cone 44, while the legs 48 support the upper cone 44 in spaced relation to the lower cone 42.

Figure 15:
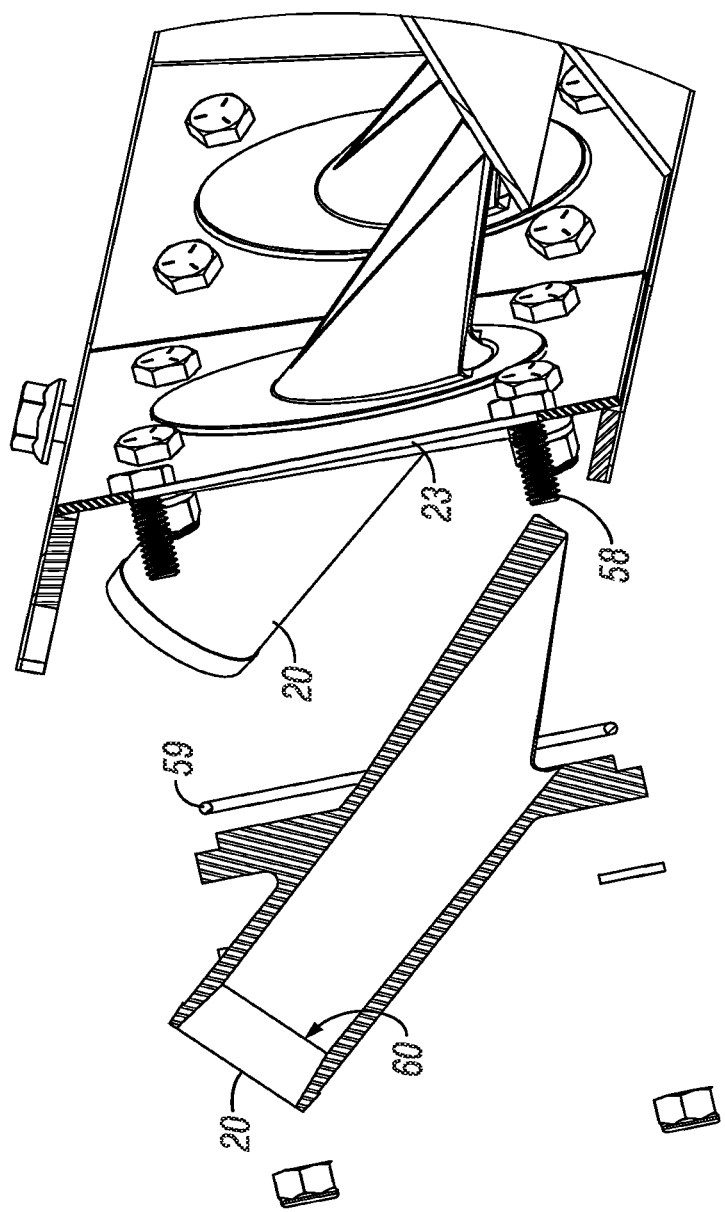
FIG. 15 is a sectional view of the seed nozzle shown in FIGS. 13 and 14.
Figure 16:
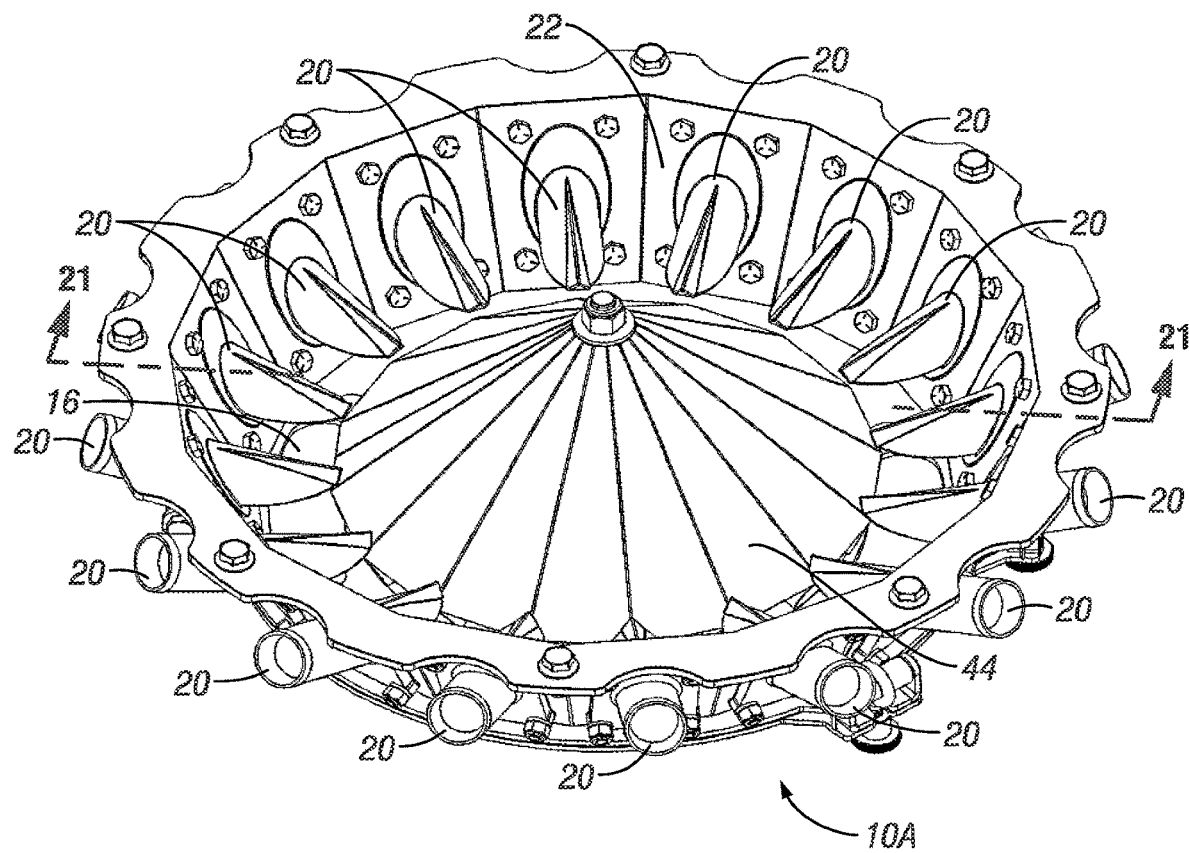
FIG. 16 is a perspective view of an alternative embodiment of the seed distributor having a plurality of air tubes to direct pressurized air to the seed tubes.
Figure 17:
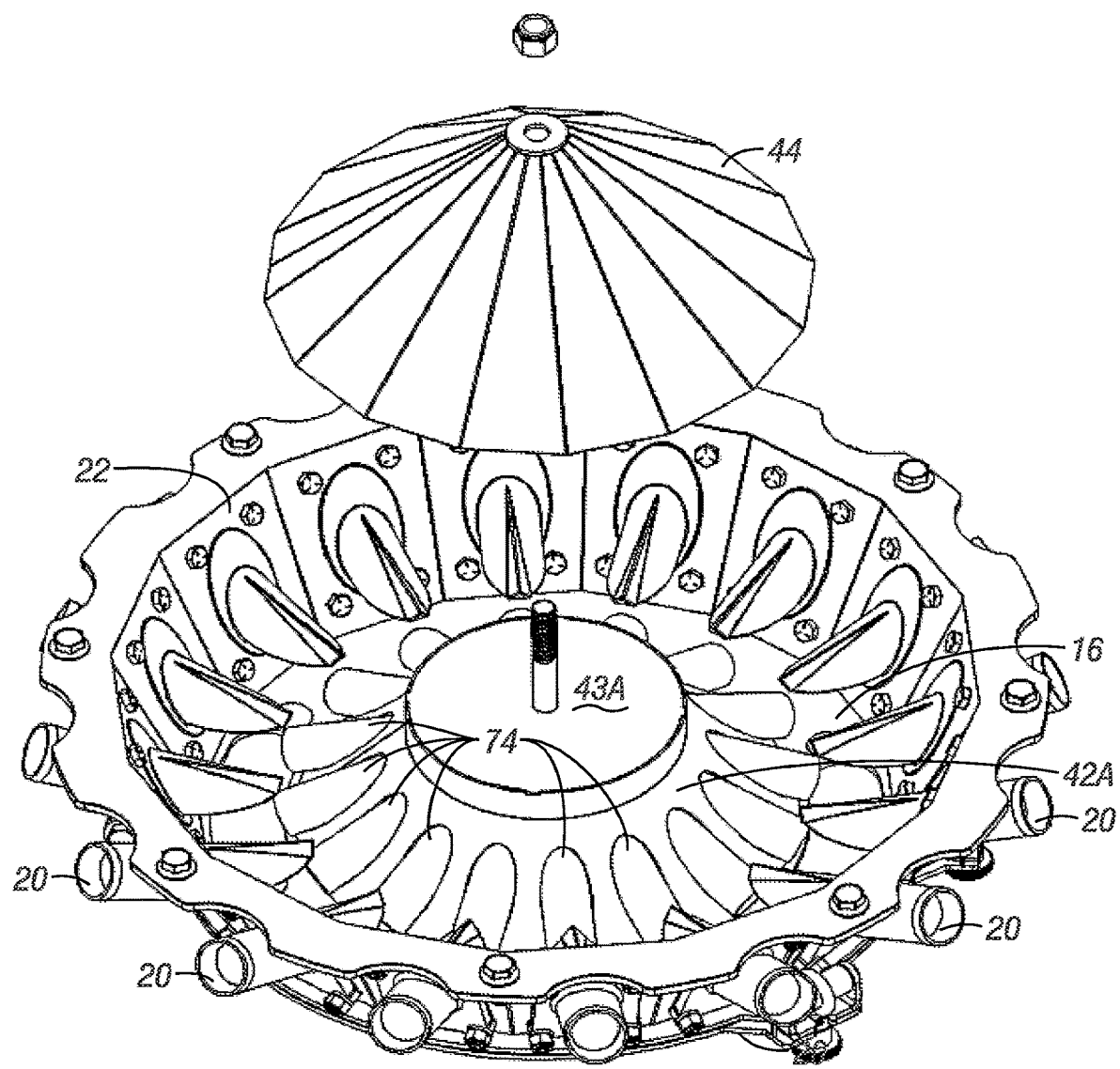
FIG. 17 is an exploded perspective view of the seed distributor shown in FIG. 16.
Figure 18:
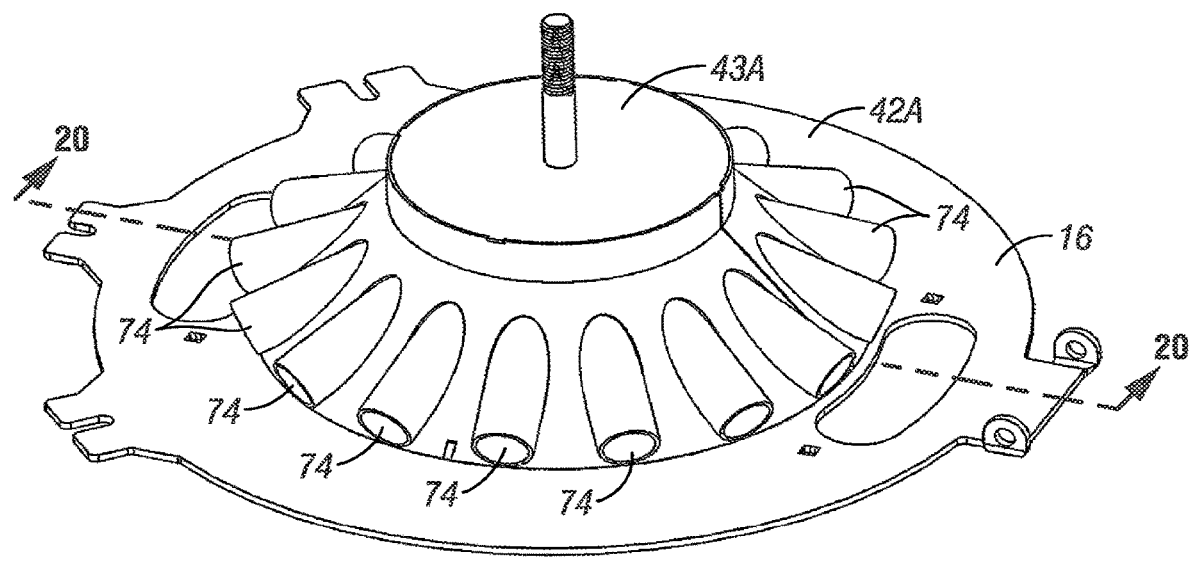
FIG. 18 is a perspective view of the floor plate of the distributor shown in FIG. 16.
Figure 19:
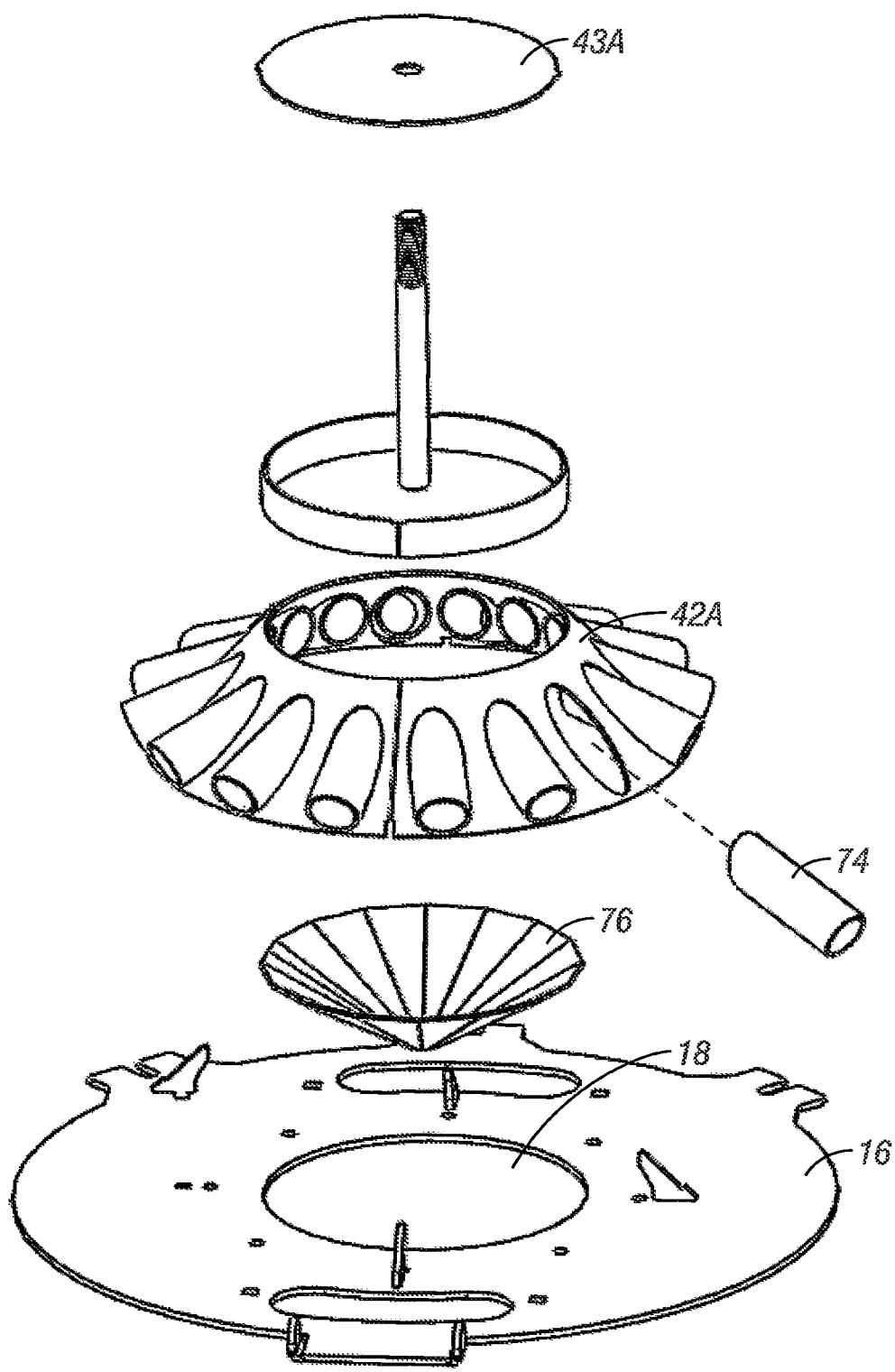
FIG. 19 is another exploded view of the distributor assembly of FIG. 16.
Figure 20:
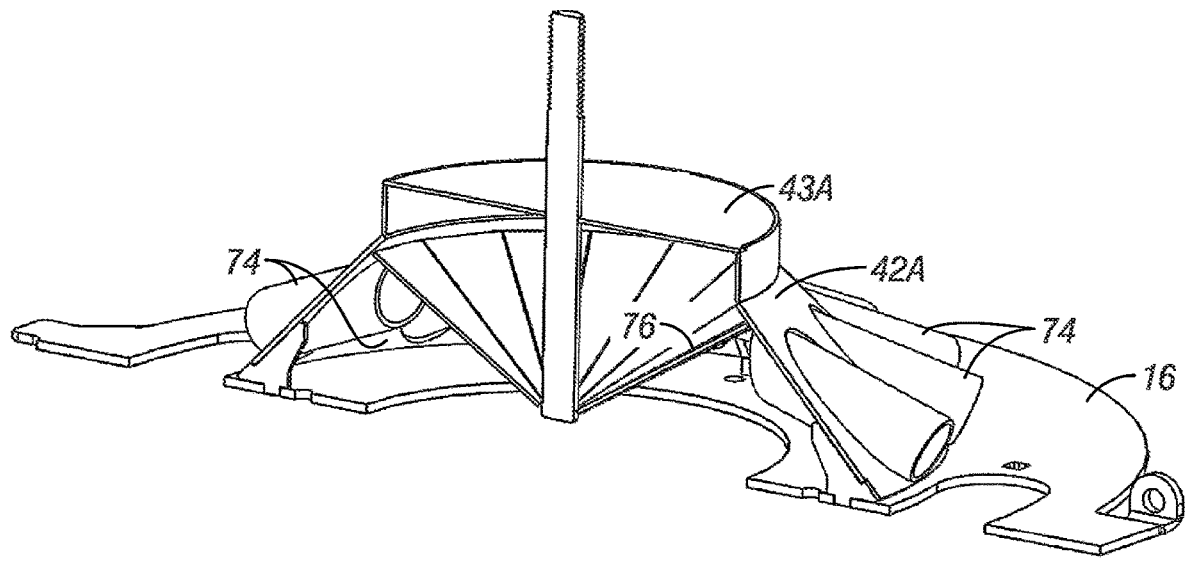
FIG. 20 is a sectional view taken along lines 20-20 of FIG. 18.
Figure 21:
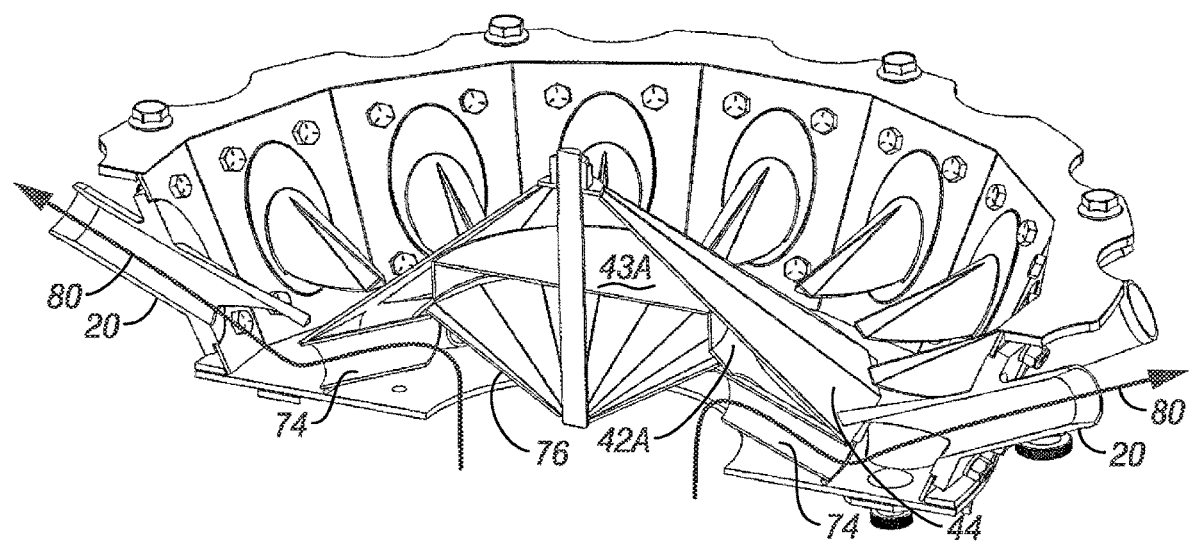
FIG. 21 of the sectional view taken along lines 21-21 of FIG. 16.

The nozzles 20 extend through openings 23 on the sidewall 22, with a seed inlet 52 residing inside the sidewall 22 and a seed discharge outlet 54 residing outside the sidewall 22. The nozzles 20 are generally inclined upwardly and extend 360° around the sidewall 22. The nozzles 20 can be mounted to the sidewall in any convenient manner. For example, in the preferred embodiment, each nozzle 20 includes a mounting flange 56 with a boss 57 and is mounted to the sidewall 22 with bolts 58. An O-ring 59 may be provided between the flange 56 and the sidewall 22. As shown in FIG. 15, each nozzle 22 preferably has a reduced diameter portion 60 adjacent to the outlet 54, which is slightly flared outwardly, so as to form a venturi to enhance or facilitate the pneumatic transport of seed through the nozzles 20. The nozzles 20 are preferable fabricated as a one-piece injection molded unit.

The floor plate 32 includes one or more cutouts or openings 62 which are normally closed by a door 64. The door 64 can be mounted on the plate 32 in various manners. In one embodiment shown in the drawings, the door 64 is retained on the plate 32 by one or more retention knobs 66 which are threadably received in an aperture in the plate 32. For example, the door 64 may have a hole for receipt of one of the knobs 66 and a slot 68 for receiving the second knob 66B, which may then be tightened to hold the door 64 in the closed position. A gasket 70 resides between the plate 32 and the door 64 to provide an airtight seal.

In use, the bulk seed distributor 10 defines a chamber or well 72 for receiving seed from the primary hopper 12 and evenly distributing the seed via the upper cone 44 to the plurality of nozzles 20. The lower cone 42 inhibits migration of the seed toward the center of the floor assembly 30 and the air inlet 16. Pressurized air flows from the air source (not shown), through the air conduit 18, and upwardly through the lower cone 42, as shown by the arrow in FIG. 9. The air flows downwardly along the inside wall of the upper cone 44 and outwardly through the space between the cones 42, 44 to the well or chamber 72 formed along the perimeter of the sidewall 22 adjacent to the floor plate 32. Pressurized air picks up seed in the chamber 72 and carries the seed through the nozzles 20 and connected hoses to the seed bins on the row planter units for planting. The airflow path is shown by arrow 80 in FIG. 9.

When planting is completed, the floor assembly 30 can be opened by unscrewing the threaded knobs 36, as shown in FIG. 10. The interior of the distributor 10 can be inspected and any residual seed can be removed, so as to avoid contamination with different seed in the next planting operation.

A second embodiment of the bulk seed distributor is 10A is shown in FIGS. 16-21. The distributor 10A is structurally and functionally similar to the distributor 10, except for the addition of air tubes 74 in the cone 42A, which has a closed top 43A and an inverted cone 76 beneath the cone 42A. The floor assembly of the distributor 10A is otherwise similar to the floor assembly of the distributor 10.

Pressurized air enters the distributor 10A through the inlet 16 and is directed to the air tubes 74 by the inverted cone 76. The air tubes 74 are aligned with the seed tubes 20, with the outlet of the air tubes 74 being adjacent the inlet of the seed tubes 20. Thus, the air tubes 74 direct the pressurized air toward the floor plate 32 and then into the seed tubes 20 so as to pneumatically carry the seeds from the round chamber 72 to the seed bins of each row planter unit. The air tubes 74 further enhance the even distribution of seeds to the seed bins through the seed tubes 20. The airflow path is designated by the arrows 80 in FIG. 21.

The round shape of the bulk seed distributor 10 eliminates uneven distribution adjacent to the inlets of the nozzles 20, as in conventional bulk seed distributors. Also, the quick and easy opening of the floor assembly 30 allows for inspection and complete seed cleanout. Thus, the distributor 10 overcomes the problems of the prior art.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. A seed distributor for delivering seed from a bulk seed tank via hoses to bins on row planter units, comprising:
   a circular chamber positioned below the bulk seed tank to receive seed from the bulk seed tank and having a circular sidewall and a floor assembly detachably connected to the sidewall;
   a plurality of seed tubes extending through the sidewall and each tube having an inlet inside the chamber and an outlet outside the chamber connected to one of the hoses;
   the floor assembly including a conical portion to direct seed from the bulk seed tank downwardly and outwardly toward the tube inlets; and
   an air inlet in the bottom of the chamber to receive pressurized air for conveying seed through the seed tubes and hoses to the bins.

2. The seed distributor of claim 1 wherein the upper cone has a lower surface to direct the pressurized air 360 degrees toward the seed tube inlets.

3. The seed distributor of claim 1 further comprising a lower cone beneath the upper cone and having a plurality of air tubes to direct air to the seed tubes.

4. The seed distributor of claim 3 further comprising an inverted cone within the lower cone to direct air to the air tubes.

5. The seed distributor of claim 1 wherein the floor assembly includes a lower cone within the upper cone to prevent migration of seed toward the air inlet.

6. The seed distributor of claim 5 wherein the upper and lower cones are concentrically positioned with the lower cone extending into the upper cone.

7. The seed distributor of claim 5 wherein the lower cone is interchangeable with a second lower cone to accommodate different seed sizes.

8. The seed distributor of claim 1 wherein the floor assembly is moveable between a closed position for seed delivery and an open position for clean out.

9. The seed distributor of claim 1 wherein the floor assembly has clean out openings.

10. The seed distributor of claim 1 wherein the air inlet is centered in the floor assembly.

11. The seed distributor of claim 1 wherein the tube outlets are flared to create a venturi when air passes therethrough.

12. A method of delivering seed from a bulk seed tank via hoses to bins on row planter units, comprising:

directing seeds from the bulk seed tank to a circular chamber below the bulk seed tank, the circular chamber having a circular sidewall, a floor assembly with a conical portion, and a plurality of seed tubes extending through the sidewall, whereby the conical portion directs seed downwardly and outwardly toward inlets of the tubes;

supplying pressurized air into the chamber and through the seed tubes for conveying seed through the seed tubes and hoses to the bins.

13. The method of claim 12 wherein the pressurized air passes beneath an air distribution cone to the seed tubes.

14. The method of claim 12 wherein the pressurized air passes through air tubes extending toward the seed tubes.

15. The method of claim 12 further comprising blocking migration of seeds to a pressurized air inlet in a floor assembly of the chamber.

16. The method of claim 15 wherein the blocking is achieved by a cone engaging a floor plate of the chamber.

17. The method of claim 12 wherein the seeds are delivered 360° to the circular chamber.

18. The method of claim 12 further comprising cleaning seed from the circular chamber by moving the floor assembly from a closed position engaging the sidewall to an open position spaced from the sidewall.

19. The method of claim 12 wherein the pressurized air is supplied through a floor assembly into the chamber.

20. The seed distributor of claim 1 wherein the tube inlets are spaced apart adjacent the floor assembly.

* * * * *

UNITED STATES PATENT AND TRADEMARK OFFICE
CERTIFICATE OF CORRECTION

PATENT NO. : 11,606,897 B2
APPLICATION NO. : 17/301197
DATED : March 21, 2023
INVENTOR(S) : Jeffrey Alan Sivinski It is certified that error appears in the above-identified patent and that said Letters Patent is hereby corrected as shown below:

In the Claims

In Column 5, Claim 2, Line 1:
Insert --conical portion includes an-- before the word "upper"
Insert --that-- after the word "cone"

In Column 6, Claim 15, Line 16:
Delete "a" after the word "in"
Insert --the-- before the word "floor"

In Column 6, Claim 16, Line 19:
Delete "a" after the word "engaging"
Insert --the-- before the word "floor"
Delete "plate" after the word "floor"
Insert --assembly-- before the word "of"

In Column 6, Claim 19, Line 27:
Delete "a" after the word "through"
Insert --the-- before the word "floor"

Signed and Sealed this
Sixteenth Day of May, 2023

Katherine Kelly Vidal
*Director of the United States Patent and Trademark Office*